(12) United States Patent
Han

(10) Patent No.: US 6,282,325 B1
(45) Date of Patent: Aug. 28, 2001

(54) IMAGE PROCESSING TECHNIQUE FOR BINARIZING AN IMAGE SCANNED BY A SHUTTLE TYPE SCANNER

(75) Inventor: Ji-Hoon Han, Seoul (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/109,769

(22) Filed: Jul. 6, 1998

(30) Foreign Application Priority Data

Jul. 4, 1997 (KR) .................................................. 97-30927

(51) Int. Cl.⁷ ..................................................... G06F 15/00
(52) U.S. Cl. ............................................ 382/270; 382/271
(58) Field of Search .................................. 382/270–272, 382/268, 251–252; 358/1.12, 1.15

(56) References Cited

U.S. PATENT DOCUMENTS 5,429,441 * 7/1995 Schulz et al. .................... 400/124.04
5,701,135 * 12/1997 Aratani et al. ......................... 345/89
5,884,015 * 3/1999 Yanaka et al. ........................ 395/115

* cited by examiner

Primary Examiner—Thomas D. Lee
Assistant Examiner—Stephen Brinich
(74) Attorney, Agent, or Firm—Robert E. Bushnell, Esq.

(57) ABSTRACT

In an image processing technique for binarizing an image scanned by a shuttle type scanner in a multifunctional machine using a small amount of memory, after scanning pixels of one slice from a document, each pixel of the scanned slice are binarized using a mask. The processing results of the error values generated during binarizing of final pixels of a plurality of slices of the band are stored in a first memory, and the processing results of error values generated during binarizing of each of the pixels of the scanned slice are stored in a second memory. When each of the first pixels of a plurality of slices in the next band are binarized, the processing results of the error values of the final pixels of a plurality of slices in the previous band, stored in the first memory, are scanned and then binarized. By using minimum band memories, the cost of the multifunctional machine can be reduced.

9 Claims, 13 Drawing Sheets

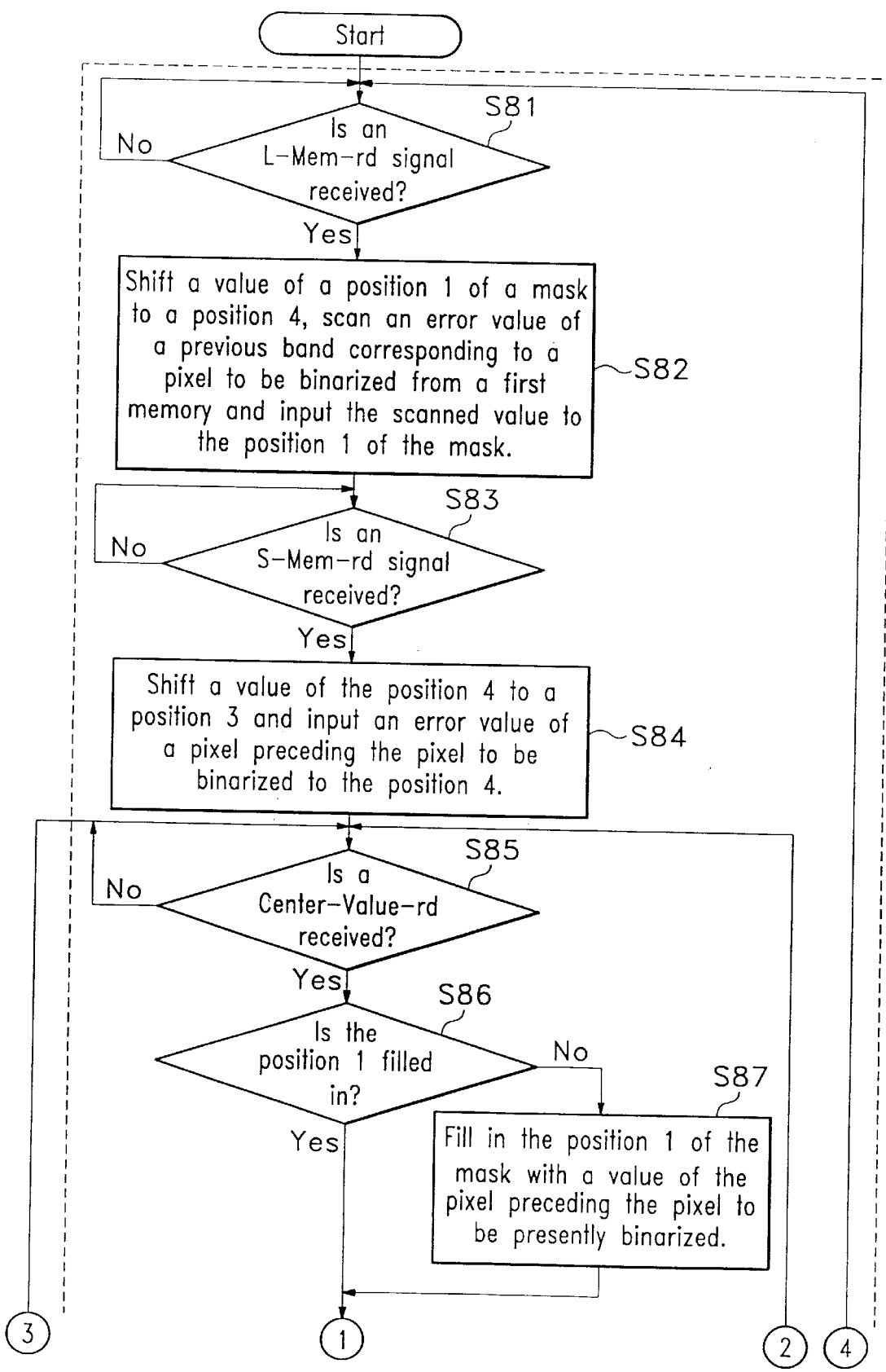

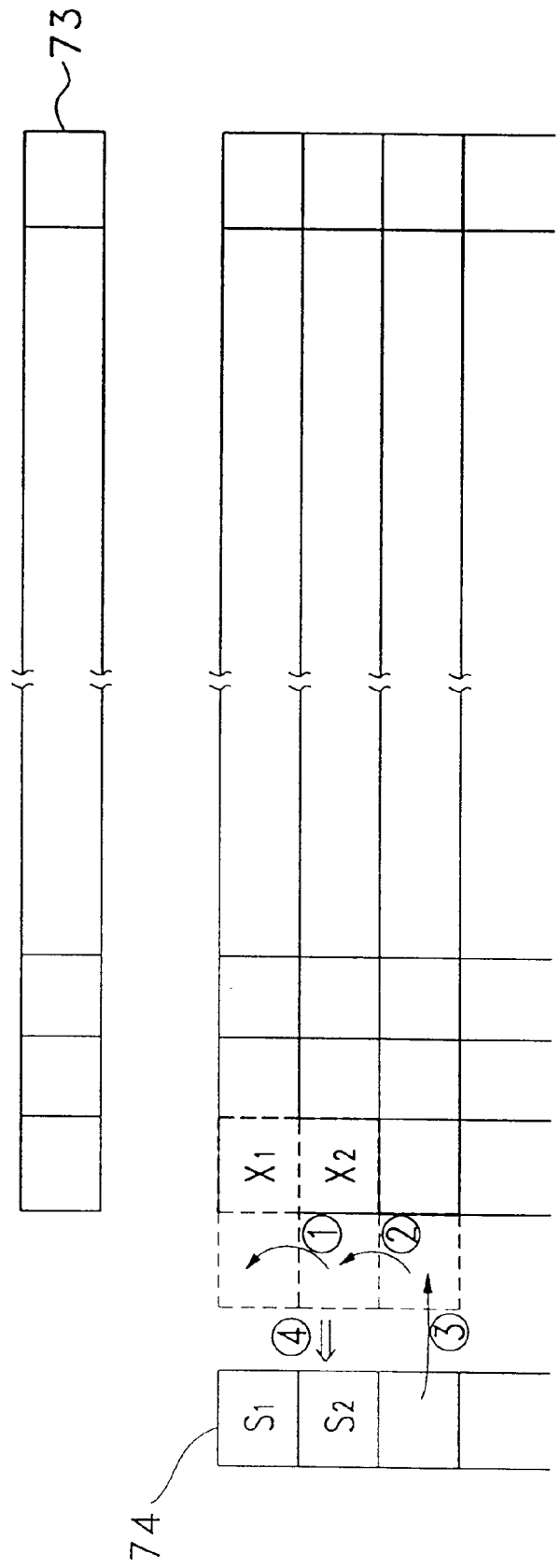

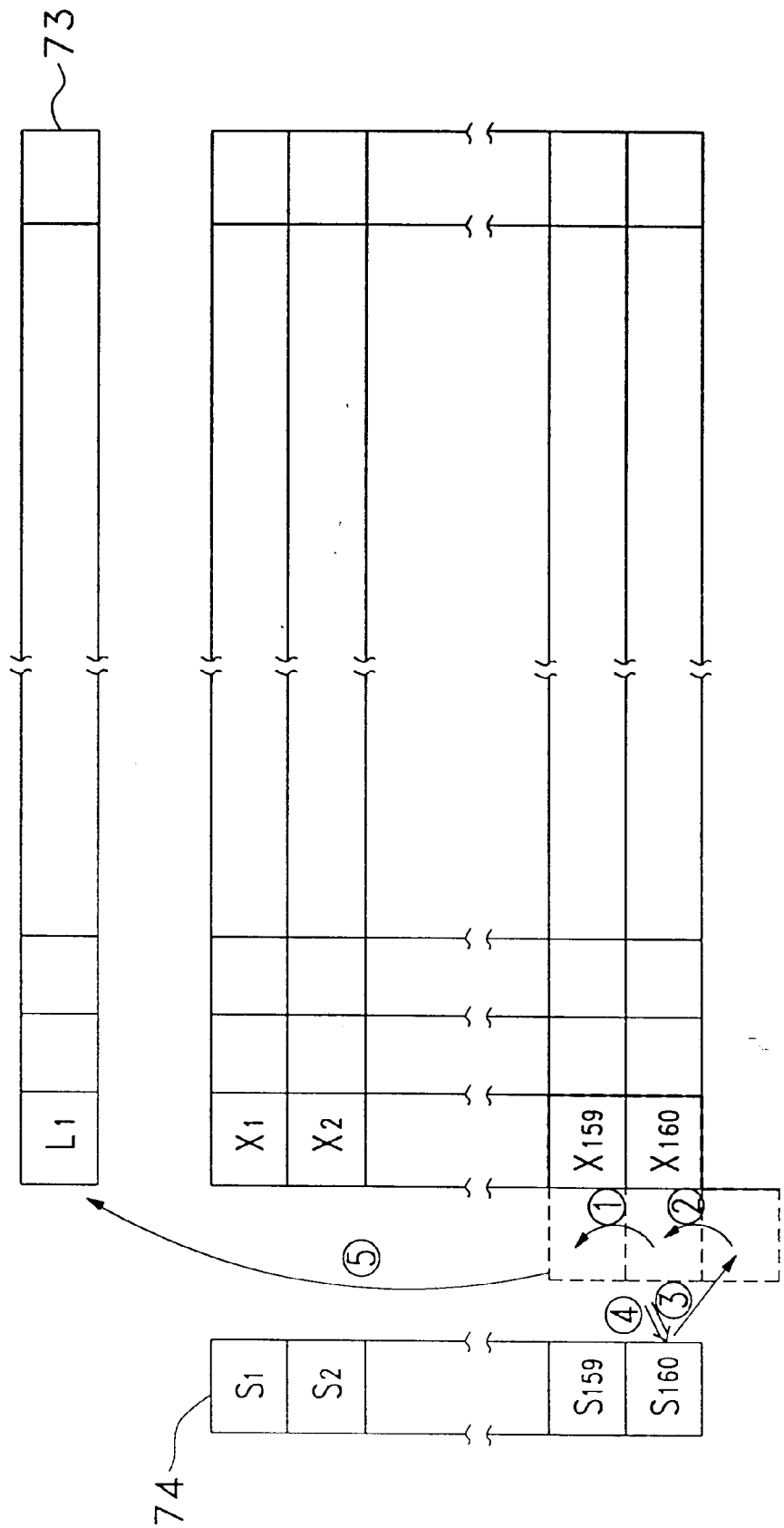

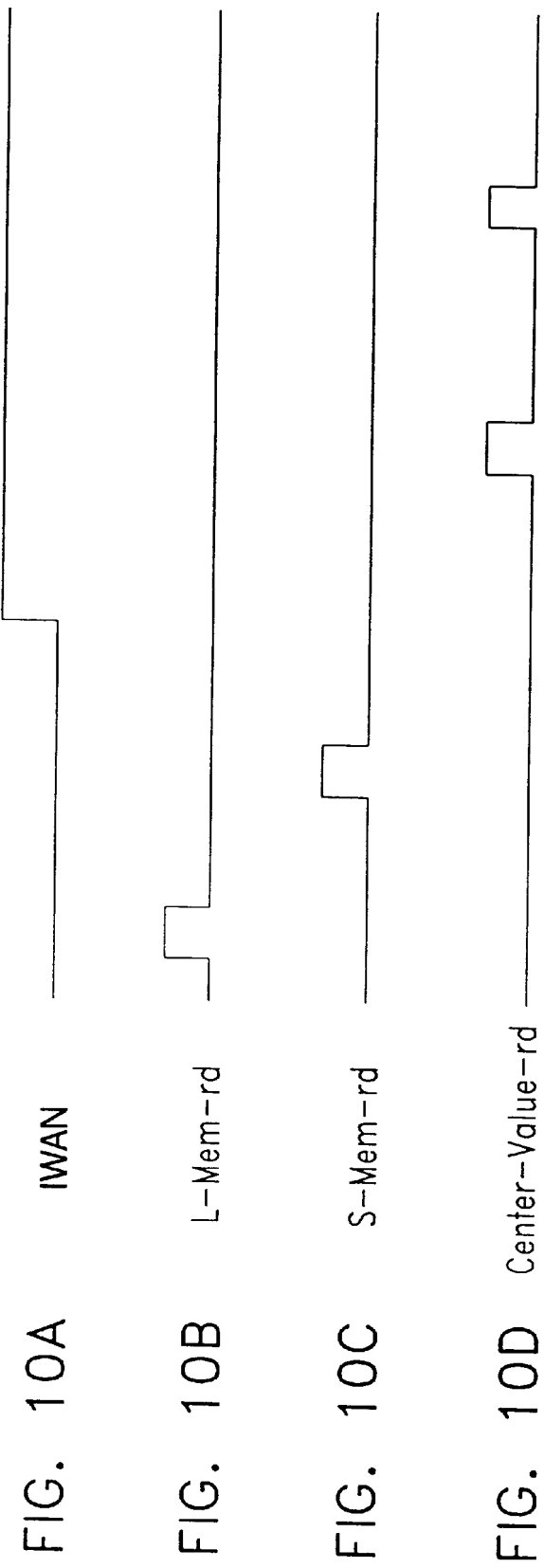

IMAGE PROCESSING TECHNIQUE FOR BINARIZING AN IMAGE SCANNED BY A SHUTTLE TYPE SCANNER

CLAIM OF PRIORITY

This application makes reference to, incorporates the same herein, and claims all benefits accruing under 35 U.S.C. § 119 from an application for IMAGE PROCESSING APPARATUS FOR BINARIZING AN IMAGE SCANNED BY A SCANNING UNIT OF SHUTTLE TYPE AND IMAGE PROCESSING METHOD THEREOF earlier filed in the Korean Industrial Property Office on the 4th of July 1997 and there duly assigned Ser. No. 30927/1997.

BACKGROUND OF THE INVENTION

1. Field of the Invention

The present invention relates to an image binarization technique and, more particularly to an image processing technique for binarizing an image scanned by a shuttle type scanner in a multifunctional machine using a small amount of memory.

2. Description of the Related Art

Conventionally, a multifunctional machine is equipped with a scanner, a printer, a modem, a computer, etc. The multifunctional machine prints data scanned by the scanner or data transmitted from another system through the modem using the printer, or stores the data in a hard disk of the computer. The multifunctional machine is manufactured to perform the functions of a facsimile machine, printer, scanner and a copying machine.

There are two types of multifunctional machines, i.e., a shuttle type and an array type. The array type which supports a rapid scanning of a document is high in price. On the contrary, the shuttle type scans the document slower than the array type. However, since the shuttle type is low in cost, it has widely been used.

The scanning operation of a shuttle type scanner is explained below.

First, a part of the document is scanned by the scanner of the multifunctional machine. The unit scanned by the scanner is called a slice.

The size of the slice is decided by the number of pixels which are scanned at a time according to the number of charged coupled devices (CCDs) mounted on the scanner. For example, assuming that the number of CCDs of the scanner is 160 pixels in the longitudinal direction and the number of CCDs is 1 in the horizontal direction, then the size of the slice is 160×1.

Scanning the document is performed by moving the scanner from the most left edge of the document to the most right edge of the document per unit of slice. The scanner performs scanning by dividing the document per unit of band. The band indicates the amount of data of the document which is scanned once in the horizontal direction by the scanner.

In order to transmit data contained in the document through the facsimile machine after scanning the document, the scanned document is changed to data values of 0 or 1. Generally, the data scanned by the scanner is a gray color and has 256 values, i.e., 0 to 255. The values are expressed by 8 bits and the process for changing the values into binary values is called a binarization.

The binarization process includes two different methods, namely, an error diffusion method (EDF) and a threshold value method. Since these methods are well known to persons skilled in the art, a detailed description thereof has been omitted.

The binarization process according to the EDF method using a mask having 3×3 pixels in a shuttle type scanner is explained below.

In order to binarize one target pixel of data which has been scanned, the data binarization is performed by diffusing an error value generated when binarizing 1 pixel to 8 pixels neighboring the target pixel around the target pixel according to the weight of each mask cell. The aforesaid technique is called data binarization by the EDF method.

Generally, in the case of performing the binarization, since it is necessary to know the values of neighboring pixels before performing the EDF operation, scanned first band data and second band data containing an S region are stored and controlled. In addition, by substituting the value of a P region with a neighboring pixel value according to the principle of image processing, the image processing is performed by constituting the 3×3 mask.

Since the binarization method needs to have a band memory for storing and controlling the scanned document per unit of band for image-processing the pixel of the scanned document, it causes an increase in the cost of the multifunctional machine.

In addition, in the case of using a 3×3 mask for one band, since no data is contained in the end part of the band and in the beginning part of the next band, a boundary between the two bands is formed.

SUMMARY OF THE INVENTION

Therefore, it is an object of the present invention to reduce the cost of a multifunctional machine by reducing the amount of band memory required in an image processing of scanned data using a 3×3 mask.

It is another object of the present invention to prevent a boundary from being formed between each band.

According to one aspect of the present invention, an image processing apparatus for binarizing an image scanned by a scanner which performs a shuttle movement per unit of slice and scans a band, includes: a scanner for scanning pixels of a slice from a document; a processor for binarizing each pixel of the scanned slice using a mask; a first memory for storing processing results of error values generated during binarization of each final pixel of a plurality of slices of the band as binarized by the processor; and a second memory for storing processing results of error values generated during binarization of each pixel of the scanned slice as binarized by the processor. When binarizing each first pixel of a plurality of slices of the next band, the processor scans processing results of the error values of final pixels of a plurality of slices of the previous band, stored in the first memory, and binarizes the value. Afterwards, the processor scans the second memory and binarizes the next pixels.

According to another aspect of the present invention, after scanning pixels of one slice from the document, each of the pixels of the scanned slice is binarized using the mask. Processing results of the error values generated during binarizing of the final pixels of a plurality of slices of the band are stored in the first memory, and processing results of the error values generated during binarizing of each of the pixels of the scanned slice are stored in the second memory. When each of the first pixels of a plurality of slices in the next band are binarized, the processing result of the error values of the final pixels of a plurality of slices in the previous band, stored in the first memory, is scanned and binarized.

Preferably, the mask has 2×3 pixels. When expressed by vertical and horizontal coordinate values, coordinate values of positions 1, 2, 3 and 4 are (2, 1), (1, 1), (1, 2) and (1, 3), respectively and a coordinate value of position of a pixel X to be binarized is (2, 2).

Preferably, a method for forming the mask includes the steps of: when binarizing the first pixel of the slice, shifting a value of the position 1, scanning an error value of a final pixel of a slice in the previous band corresponding to the pixel X to be binarized from the first memory and inputting the value to the position 1; shifting a value of the position 4 to the position 3, scanning an error value of a pixel preceding the pixel X to be binarized from the second memory and inputting the error value to the position 4; when a signal for scanning the value of pixel X to be binarized is received and the position 1 is not filled in, filling in the position 1 with a value of the pixel preceding the pixel X to be binarized in the same slice and acquiring a pixel to be binarized next; and when the position 1 is filled in, shifting the value of the position 4 to the position 3 and shifting the value of the position 3 to the position 2, and inputting an error value of a pixel having a horizontal coordinate value larger by one (1) than the pixel X to be binarized from among the pixels of the previous slice to the position 4.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein;

FIGS. 8A and 8B together form a flowchart illustrating an image processing method for binarizing the image scanned by a shuttle type scanner according to the present invention;

FIGS. 9A to 9D are views explaining a process for forming the 2×3 mask using a first memory and a second memory; and FIGS. 10A to 10D are timing charts illustrating the synchronization process of signals generated by a signal generating unit according to the present invention.

DETAILED DESCRIPTION OF THE PREFERRED EMBODIMENTS

The objects, characteristics and advantages of the above-described invention will be more clearly understood through the preferred embodiments referring to the attached drawings.

As the terms mentioned later are determined based upon the function of the present invention and can be changed according to the technician's intention or usual practice, the terms should be determined considering the overall contents of the specification of the present.

Figure 1:
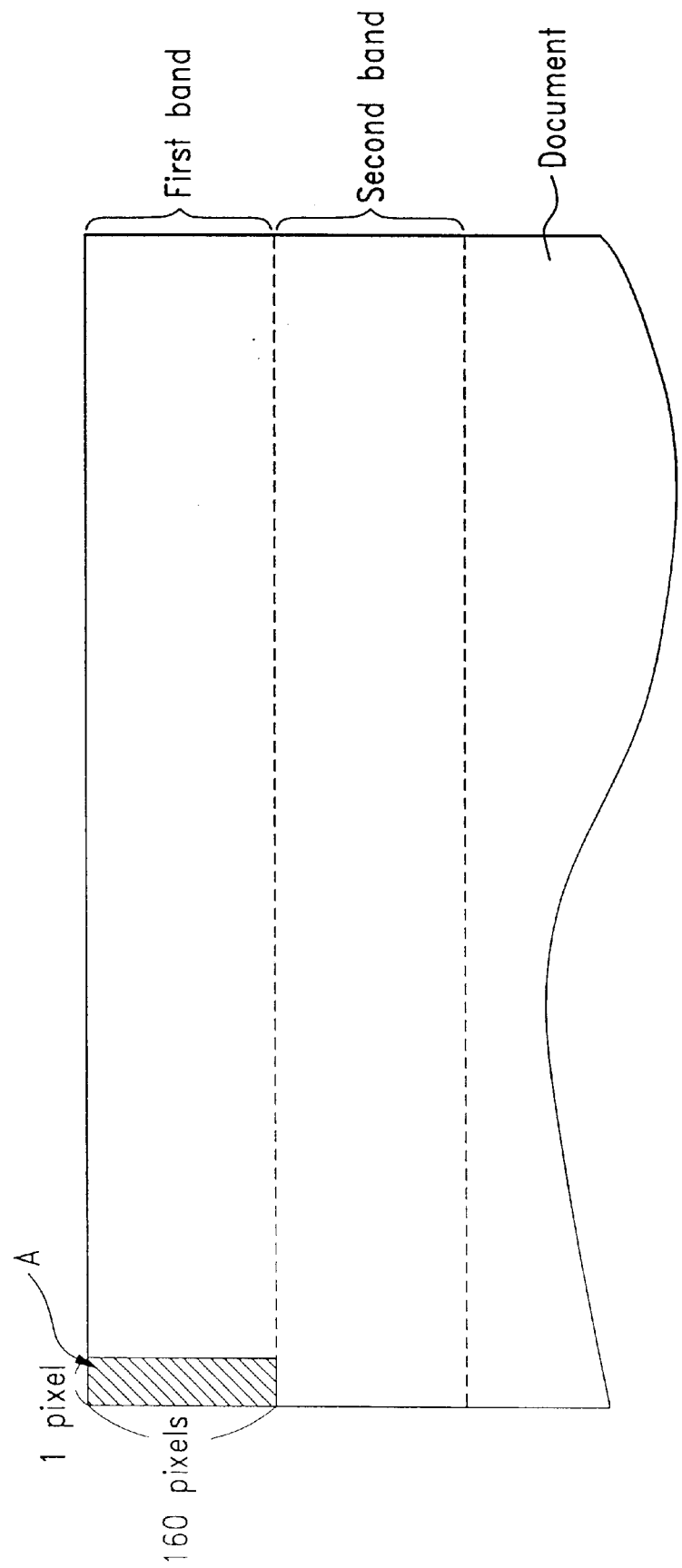
FIG. 1 is a view illustrating a scanning operation in a shuttle type scanner.
Figure 2:
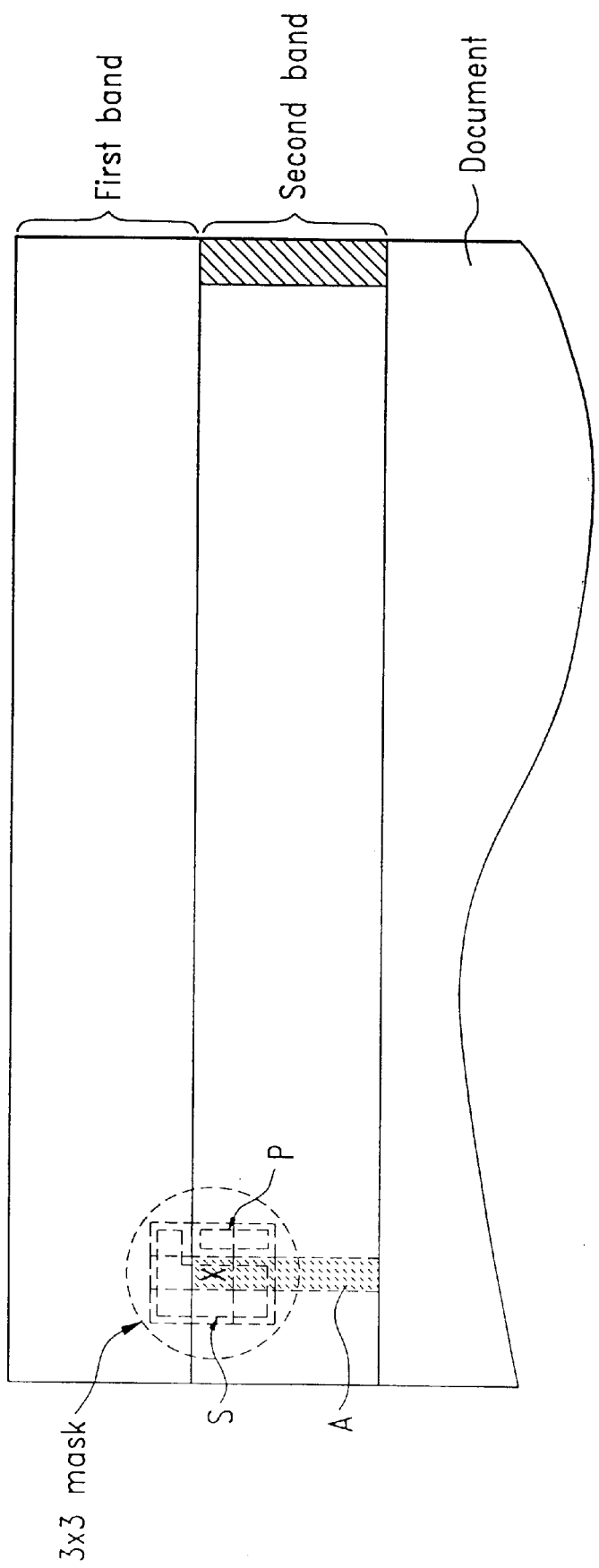
FIG. 2 is a view illustrating a binarization according to an error diffusion method using a 3×3 mask in the shuttle type scanner.

FIG. 1 illustrates a scanning operation in a shuttle type scanner as discussed in detail in the Description of the Related Art above while FIG. 2 is a view illustrating a binarization according to a diffusion method using a 3×3 mask in the shuttle type scanner discussed in detail in the Description of the Related Art above.

Figure 3:
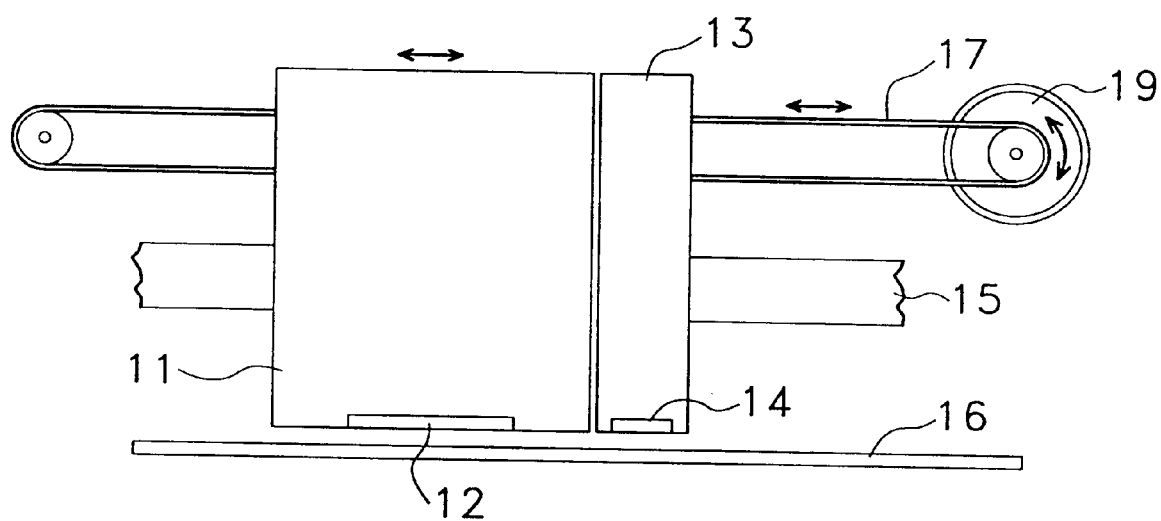
FIG. 3 is a front view of a multifunctional machine equipped with a scanner and a printing unit of the shuttle type.

FIG. 3 is a front view of a multifunctional machine equipped with a scanner and a printing unit of the shuttle type. The operation of the multifunctional machine equipped with the scanner and the printing unit of the shuttle type is explained with reference to FIG. 3.

An ink-jet printer head module 11 which sprays ink onto a printable medium and performs printing and a scanning module 13 which scans data from a document are mechanically connected to each other. For printing and scanning operations, they perform a reciprocal movement right and left by a rotation driving force of a driving motor 19 which is transmitted through a belt 17 along a guide shaft 15.

When the ink-jet printer head module 11 and the scanning module 13 perform the reciprocal movement right and left, the ink stored in the ink-jet printer head module 11 is sprayed onto a printable medium 16 through an ink-jet printer head unit 12.

Figures 4, 5:
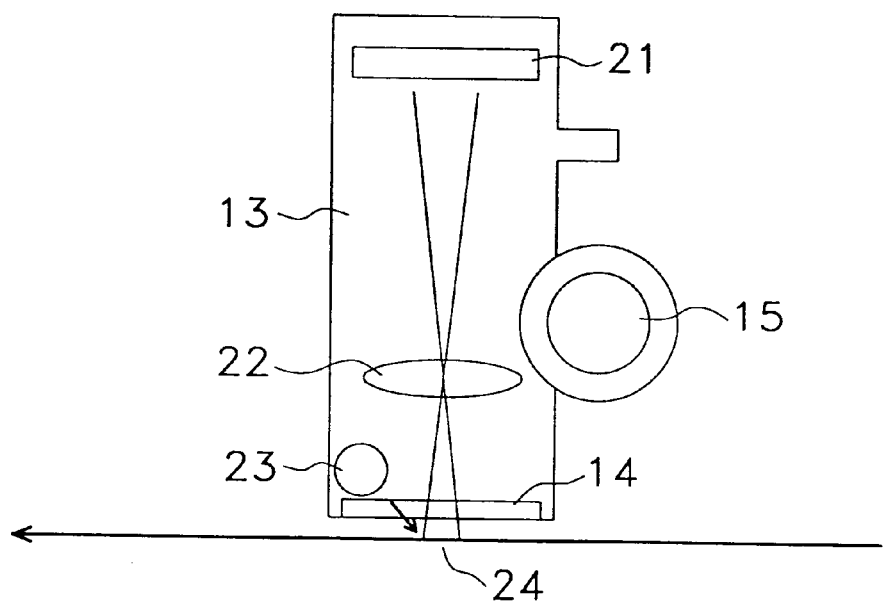
FIG. 4 is a side view of the scanner of FIG. 3.
FIG. 5 is a view illustrating a 2×3 mask for image-processing according to the present invention.

Similarly, when the ink-jet printer head module 11 and the scanning module 13 perform the reciprocal movement right and left, a lamp 23 in the scanning module 13 of FIG. 4 radiates light on a scan position 24 of the document 16. The reflected light arrives at an optical sensor 21 through a scanning glass 14 and a lens 22.

The scanned image data is binarized through an error diffusion (EDF) method using a 2×3 mask.

Referring to FIG. 5, the 2×3 mask for image-processing according to the present invention is explained. The values of the mask are filled in positions corresponding to each number, and an error value processing of a pixel X is performed. In the preferred embodiment of the present invention, the mask is displayed with a horizontal coordinate value and a vertical coordinate value. Accordingly, coordinate values of the positions 1 and 2 are (2, 1) and (1, 1), respectively. Similarly, coordinate values of the positions 3 and 4 are (1, 2) and (1, 3), respectively. A coordinate value of the position of the pixel X to be binarized is (2, 2).

Figure 6:
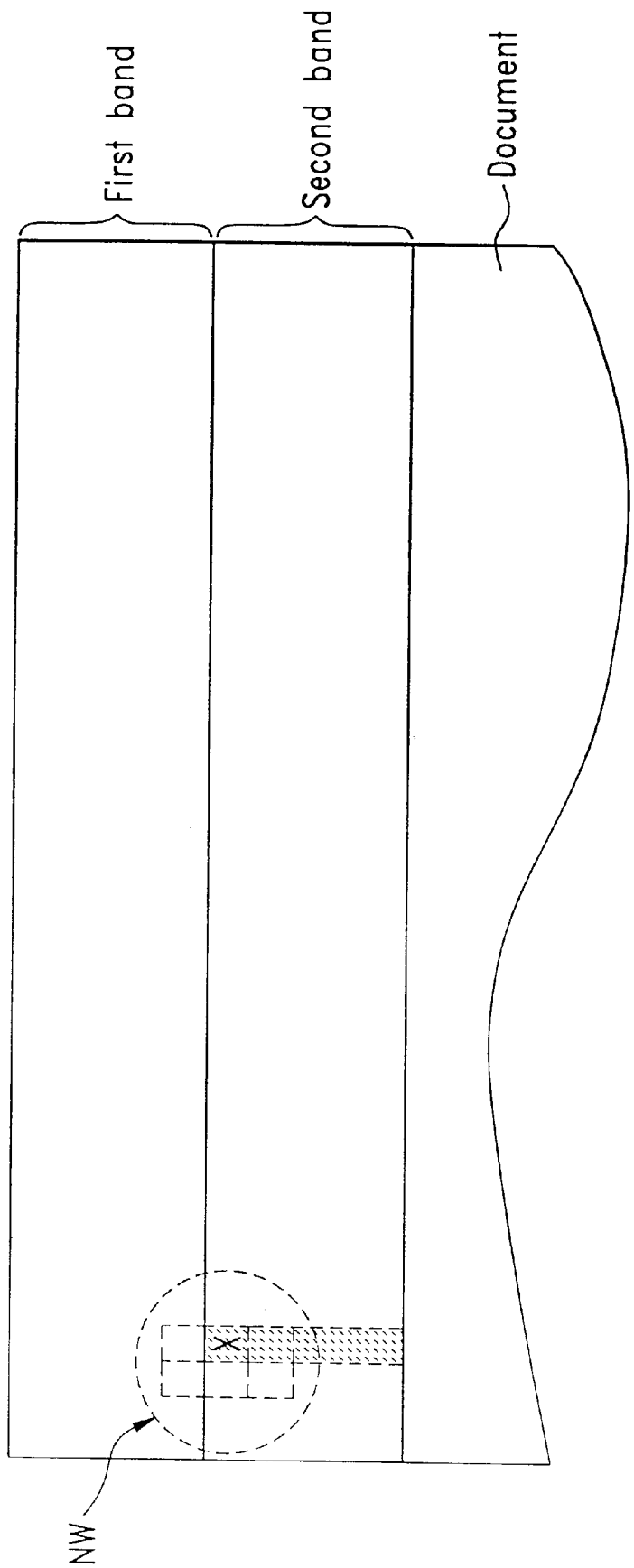
FIG. 6 is a view illustrating an image processing in a band boundary using the 2×3 mask according to the present invention.

FIG. 6 is a view illustrating the image processing in a band boundary using the 2×3 mask according to the present invention. The 2×3 mask is moved in the longitudinal direction of the slice per unit of pixel and is binarized through the error value processing.

Figure 7:
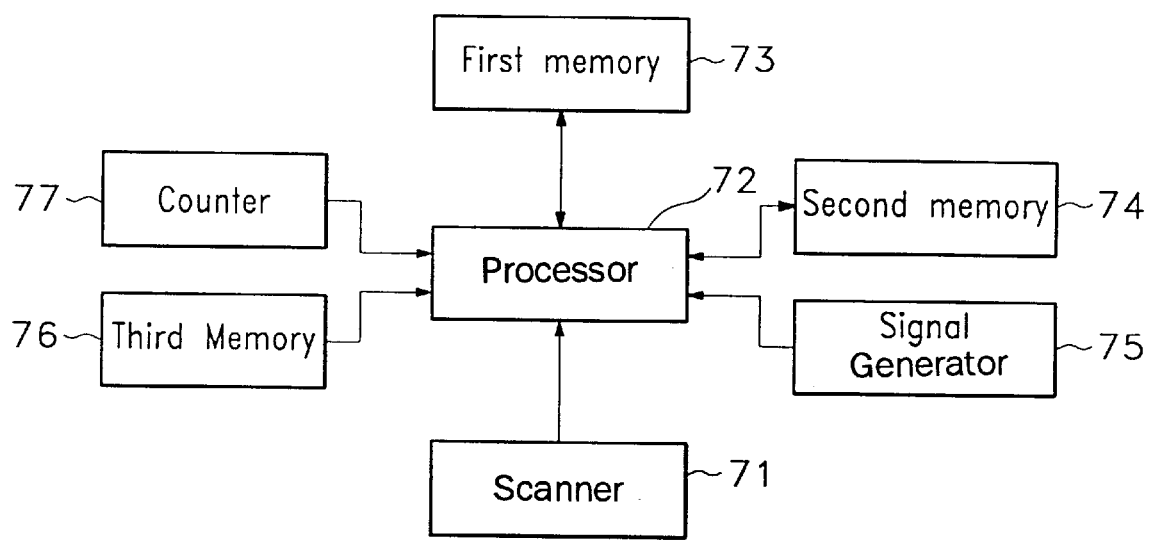
FIG. 7 is a block diagram illustrating an image processing apparatus for binarizing an image scanned by a shuttle type scanner according to the present invention.

FIG. 7 is a block diagram illustrating an image processing apparatus for binarizing the image scanned by a shuttle type scanner according to the present invention.

As shown in the drawing, the image processing apparatus includes: a scanner 71 for scanning pixels of one slice from the document; a processor for binarizing the pixels of the slice using the mask; a first memory 73 for storing processing results of error values generated during binarization of each final pixel of a plurality of slices in the band as binarized by the processor; a second memory 74 for storing processing results of error values generated during binarization of each pixel of the slice which are scanned by the processor 72 as binarized; a third memory 76 for storing a program 11 for image-processing and data for image-processing; a signal generator 75 for generating a synchronization signal for binarizing the data; and a counter 77 for counting the number of slices scanned by the scanner 71.

When each of the first pixels of a plurality of slices in a next band is binarized, the processor 72 scans the processing result of the error values of the final pixels of a plurality of slices of the previous band, stored in the first memory 73 and binarizes the values. Afterwards, the processor 72 scans the second memory 74 and binarizes the next pixels.

Figure 8B:
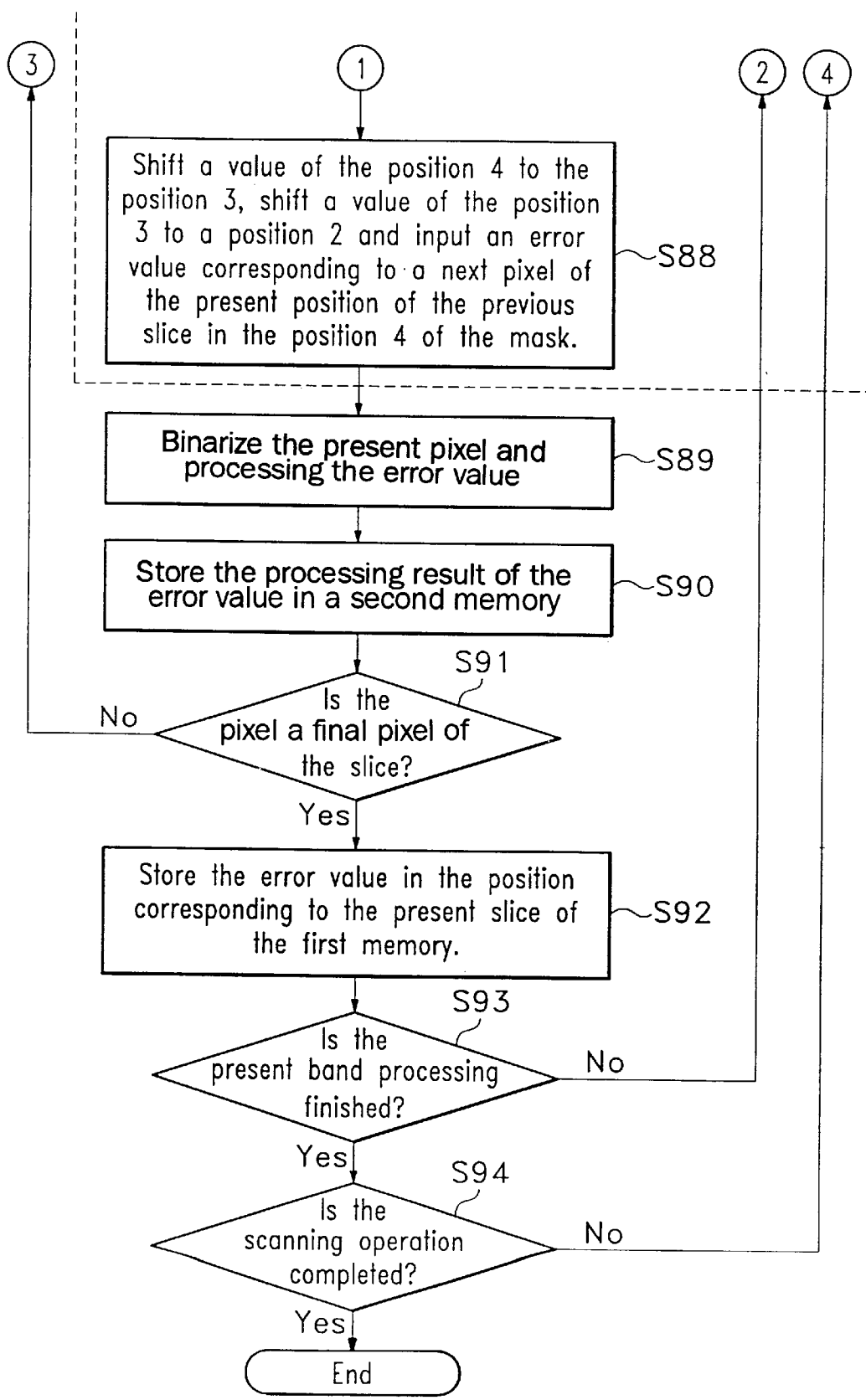

FIGS. 8A and 8B together form a flowchart illustrating the image processing method for binarizing the image scanned by a shuttle type scanner according to the present invention.

The image processing method for binarizing the image scanned by the scanner includes the steps of: judging whether a first memory scanning signal L-Mem-rd is received, after the data of one slice is scanned (step 81); when the first memory scanning signal L-Mem-rd is received, shifting a value of the position 1 of the mask to the position 4, scanning an error value of a final pixel of the slice in the previous band corresponding to the pixel to be binarized from the first memory 73 and inputting the error value to the position 1 of the mask (step 82); judging whether a second memory scanning signal S-Mem-rd is received (step 83); when the second memory scanning signal S-Mem-rd is received, a value of the position 4 is shifted to the position 3, scanning the error value of a pixel preceding the pixel X to be binarized from the second memory 74 and inputting the error value to the position 4 (step 84); judging whether a signal Center-Value-rd for scanning the value of the pixel to be binarized is received (step 85); checking whether the position 1 of the mask is filled in (step 86); when the signal Center-Value-rd for scanning the value of the pixel to be binarized is received and the position 1 of the mask is not filled in, filling in the position 1 of the mask with the value of the pixel preceding the pixel X to be binarized in the same slice and scanning the pixel to be binarized (step 87); when the position 1 of the mask is filled in, shifting the value of the position 4 of the mask to the position 3 and the value of the position 3 to the position 2, and inputting an error value of a pixel having a horizontal coordinate value larger by one (1) than the pixel X to be binarized among the pixel of the previous slice to the position 4 of the mask (step 88); binarizing the present pixel value using the formed mask and processing the error value (step 89); storing the processing result of the error value in the second memory 74 (step 90); judging whether the pixel presently binarized is the final pixel of the slice, and when the pixel is not the final pixel, returning to step 85 of judging whether the signal Center-Value-rd for scanning the value of the pixel to be binarized is received (step 91); when the pixel is the final pixel, storing the error value in the position corresponding to the present slice of the first memory 73 (step 92); judging whether the present band processing is completed, and when the band processing is not completed, returning to step 85 of judging whether the signal Center-Value-rd for scanning the value of the pixel to be binarized is received (step 93); and when the band processing is completed and the scanning operation is not completed, returning to step 81 of judging whether the first memory scanning signal L-Mem-rd is received (step 94).

FIGS. 9A to 9D are views illustrating the process of forming the 2×3 mask using the first and second memories and FIGS. 10A to 10D are timing charts illustrating the synchronization process of the signals generated by the signal generating unit according to the present invention.

The operation of the image processing apparatus for binarizing the image scanned by a shuttle type scanner according to the present invention is explained as follows.

First, after processing the previous band before an IWAN signal which indicates the beginning of the binarization image processing is generated from the signal generating unit 75, it is judged whether the first memory scanning signal L-Mem-rd for scanning the error information from the first memory 73 which stores error values of the final pixels of each of the stored slices is generated by the signal generating unit 75 (step 81). In the preferred embodiment of the present invention, since error values which have been previously processed are not set in the first and second memories, the error values are initialized to zero (0) and then binarized, when the pixels of the first slice of the first band are binarized.

Figure 9A:
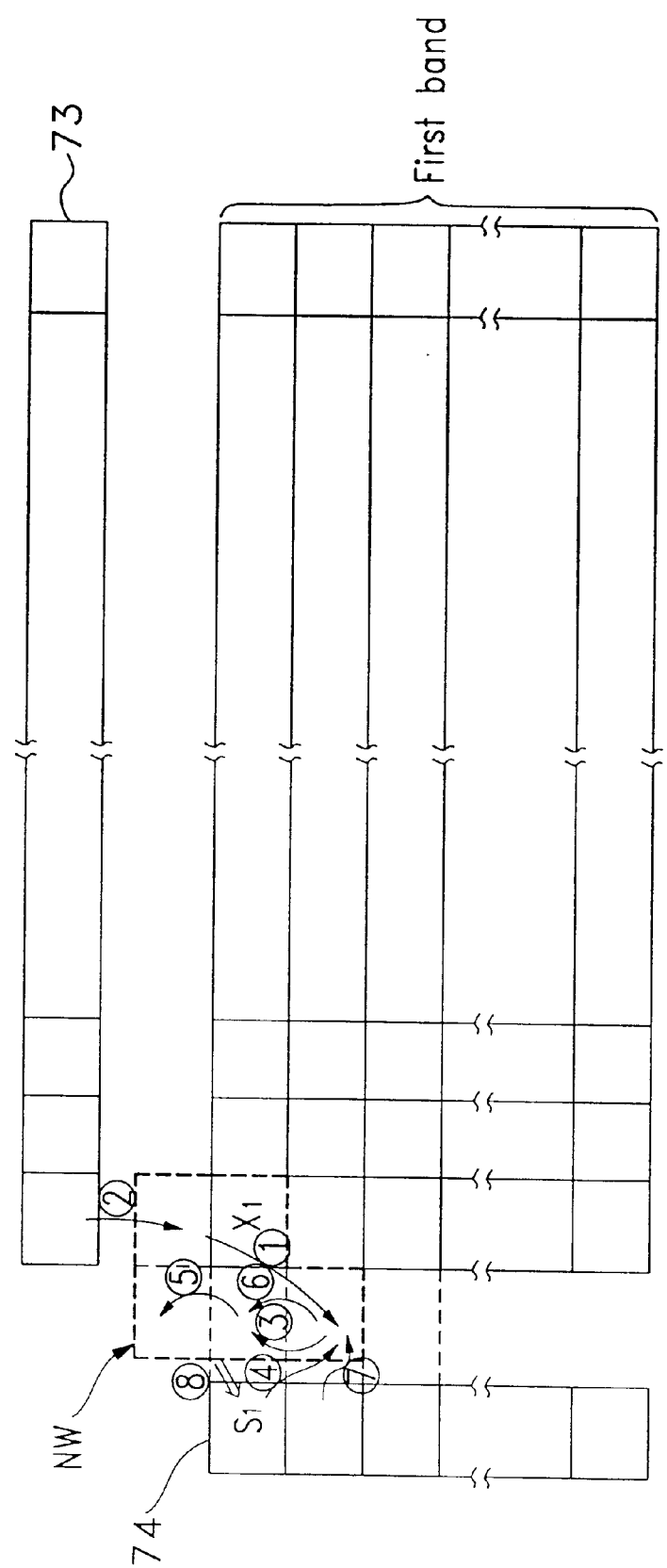

When the first memory scanning signal L-Mem-rd is generated, the value of the position 1 of the mask shown in FIG. 5 is shifted to the position 4. Afterwards, the error value of the previous band corresponding to the pixel to be binarized is scanned from the first memory 73 and inputted to the position 1 of the mask (step 82). In other words, operations ① and ② of FIG. 9A are performed.

After inputting the values at the positions 1 and 4, it is judged whether the second memory scanning signal S-Mem-rd is generated by the signal generating unit 75 in order to obtain the error information for forming the mask from the second memory 74 which stores the processing result of the error values generated when each of the pixels of one slice is binarized (step 83). In the preferred embodiment of the present invention, the processor 72 receives the first and second scanning signals L-Mem-rd and S-Mem-rd and forms the mask accordingly.

When the second memory scanning signal S-Mem-rd is generated, the value of the position 4 of the mask shown in FIG. 5 is shifted to the position 3 and the error value of the pixel preceding the pixel X to be binarized is inputted to the position 4. In other words, operations ③ and ④ of FIG. 9A is performed.

After inputting the error values to the positions 1, 3 and 4, it is judged whether the signal Center-Value-rd for scanning the value of the pixel to be binarized is received (step 85).

Afterwards, it is determined whether the position 1 of the mask is filled in (step 86).

When the signal Center-Value-rd for scanning the value of the pixel to be binarized is received and the position 1 of the mask is not filled in, the value of the pixel preceding the pixel to be presently binarized is filled in the position 1 of the mask and the pixel to be binarized is scanned (step 87). In other words, value $X_1$ is inputted to the position 1 of the mask and the value of the scanned pixel is inputted to the pixel position to be binarized presently, i.e., $X_2$, at the same time.

When the position 1 of the mask is filled in, the value of the position 4 of the mask is shifted to the position 3, and the value of the position 3 is shifted to the position 2. Moreover, the error value corresponding to a next pixel of the present position in the previous slice is inputted to the position 4 of the mask (step 88). That is, operations ①, ② and ③ of FIG. 9B are performed.

As described, after forming the mask corresponding to a pixel to be binarized, the present pixel value is binarized using the formed mask and the error value is processed (step 89). In the binarization method used in the preferred embodiment of the present invention, the error value corresponding to the relevant pixel is diffused to the neighboring pixels using the error diffusion method.

After processing the error value, the processing result $S_1$ of the error value is stored in the position corresponding to the present pixel of the second memory 74 (step 90). That is, operation ⑧ of FIG. 9A is performed, and after shifting the mask by one (1) pixel in the longitudinal direction and forming the mask, the operation ④ of FIG. 9B is performed.

After the processing result of the error value of the present pixel is stored in the second memory 74, it is judged whether the pixel presently binarized is the final one of the slice (step 91).

When the pixel is not the final pixel, the image processing of the present slice is continuously performed by returning to step 85 for judging whether the signal Center-Value-rd for scanning the pixel value to be binarized is received.

When the pixel is the final pixel, the error value S2 is stored in the position corresponding to the present slice of the first memory 73 (step 92). That is, operation ⑤ of FIG. 9C is performed.

After storing the error value in the position corresponding to the present slice of the first memory 73, it is determined whether the present band processing is completed (step 93).

When the band processing is not completed, the image processing is continuously performed by returning to step 85 for judging whether the signal Center-Value-rd for scanning the pixel value to be binarized is received.

Figure 9D:
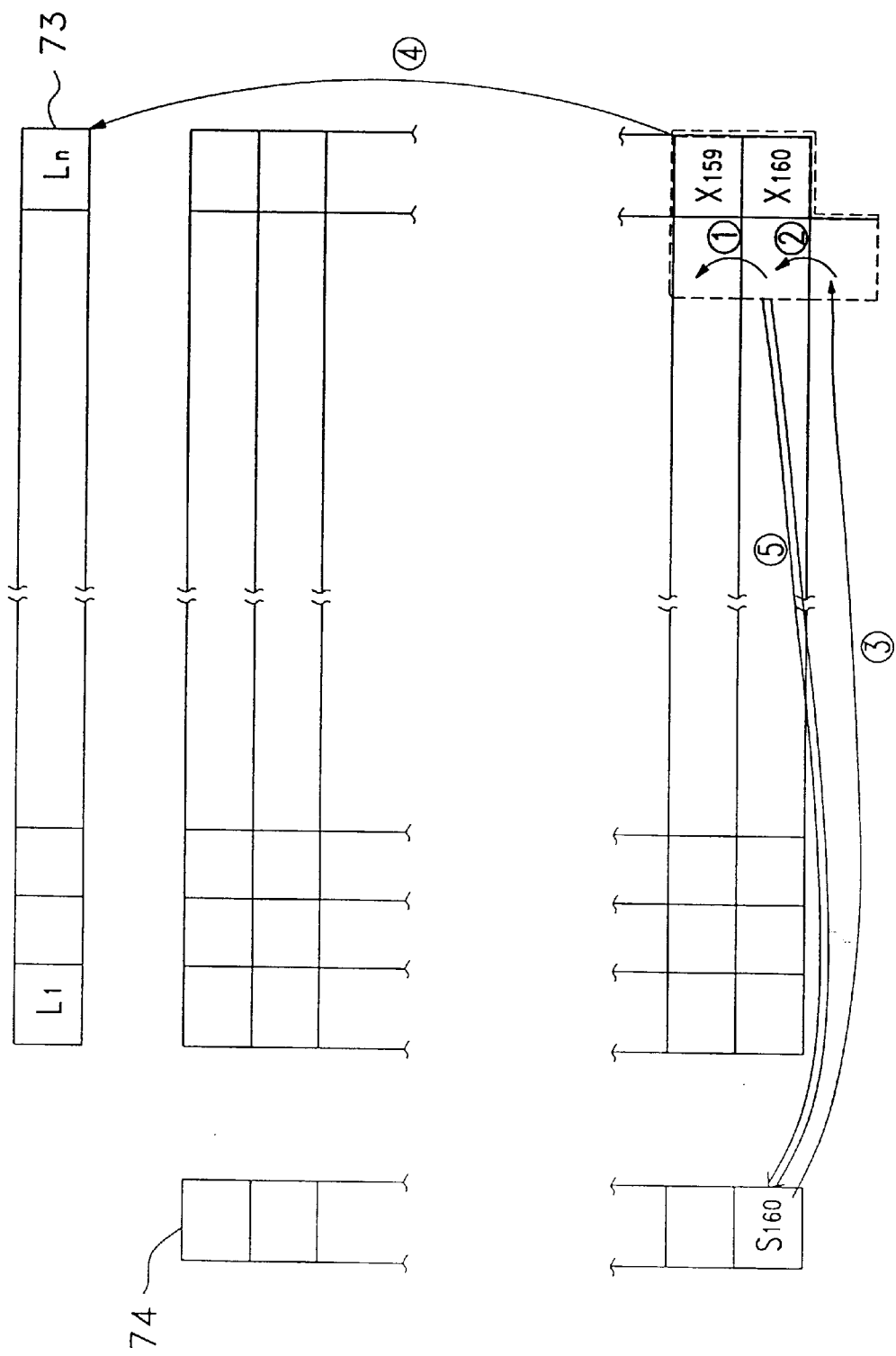

When the band processing is completed and the scanning operation is not completed, the image processing is continuously performed by returning to step 81 for judging whether the first memory scanning signal L-Mem-rd is received. FIG. 9D shows the processes ④ and ⑤ for storing the processing result of the error value of the final pixel of the final slice of the band in the first and second memories 73 and 74.

According to the present invention, the document data can be binarized using the first memory 73 having bytes corresponding to the number of pixels of a document size in the horizontal direction and the second memory 74 capable of storing the bytes corresponding to one slice, without forming a boundary image between each band.

In the preferred embodiment of the present invention, assuming that the document size to be scanned is A4 and the performance of the scanner is 300 DPI, the first memory requires the storage capacity of 2,500 bytes, that is, capable of storing the 2,500 pixels. When the scanner has a scanning element having 160 pixels, the second memory 74 requires the storage capacity of 160 bytes.

As compared with the earlier arrangements which require the storage capacity for one band memory, i.e., 2,500 bytes×160 bytes and for the memory for storing basic pixel values for forming the mask, the present invention requires a smaller amount of memory.

As described above, since the scanned document data is binarized using a small amount of memory, the cost reduction of the multifunctional machine can be realized.

While there have been illustrated and described what are considered to be preferred embodiments of the present invention, it will be understood by those skilled in the art that various changes and modifications may be made, and equivalents may be substituted for elements thereof without departing from the true scope of the present invention.

For example, the final value of the previous band is not limited to an error value. That is, the error value or another value rather than the error value can be used as the final value according to the binalization method. Since the error diffusion method is used in the example embodiment in the specification, the error value is used accordingly. However, various values, e.g., simply read value, etc., can be stored in the line memory (first memory) according to the binarization method.

Furthermore, neighboring pixels can occupy one adjacent line or several lines according to the size of the mask and neighboring band means a previous band or a next band of a predetermined band.

Still furthermore, while the target pixel moves from the upper part in a direction towards the lower part in the example embodiment in the specification, it is also possible to move the target pixel from the lower part towards the upper part.

In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An image processing apparatus for binarizing an image scanned by a shuttle type scanner, said scanner scanning a document by moving laterally across a band of the document to successively scan each slice of said band, then moving longitudinally along the document to the next adjacent band, and repeating the foregoing steps until each slice of each band of the document has been scanned, said apparatus comprising:

a scanner for scanning pixels of a slice from a document;

a processor for binarizing each pixel of said scanned slice using a mask;

a first memory for storing processing results of error values generated during binarization of each final pixel of a plurality of slices of said band as binarized by said processor; and a second memory for storing processing results of error values generated during binarization of each pixel of said scanned slice as binarized by said processor, wherein, upon binarizing a first pixel of each of a plurality of slices of a next band, said processor scans processing results of error values of final pixels of a plurality of slices of a previous band stored in said first memory and binarizes the values, and then scans said second memory and binarizes next pixels.

2. The apparatus of claim 1, said processor binarizing each pixel by an error diffusion (EDF) method using a 2×3 mask.

3. An image processing method for binarizing an image scanned by a shuttle type scanner, said scanner scanning a document by moving laterally across a band of the document to successively scan each unit-pixel wide slice of said band, then moving longitudinally along the document to the next adjacent band, and repeating the foregoing steps until each slice of each band of the document has been scanned, said method comprising the steps of:

(1) scanning pixels of one slice of a document;

(2) binarizing each pixel of said scanned slice using a mask;

(3) storing processing results of error values generated during binarizing each final pixel of a plurality of slices of said band in a first memory; and (4) storing processing results of error values generated during binarizing of each of the pixels of said scanned slice in a second memory;

wherein, during said step of binarizing each pixel, upon each first pixel of a plurality of slices in a next band being binarized, the processing results of the error values of the final pixels of a plurality of slices in the previous band, stored in said first memory, are scanned and binarized.

4. The method of claim 3, said mask having 2×3 pixels, and upon being expressed by vertical and horizontal coordinate values, having coordinate values of positions 1, 2, 3 and 4 which are (2, 1), (1, 1), (1, 2) and (1, 3), respectively and a coordinate value of the position of a pixel X to be binarized being (2, 2).

5. The method of claim 4, said mask being formed by the steps of:
   (a) during binarizing the first pixel of said slice, shifting a value of said position 1 to said position 4, scanning an error value of a final pixel of a slice in the previous band corresponding to said pixel X to be binarized from said first memory and inputting the value to said position 1;
   (b) shifting a value of said position 4 to said position 3, scanning an error value of a pixel preceding said pixel X to be binarized from said second memory and inputting the error value to said position 4;
   (c) upon a signal for scanning the value of said pixel X to be binarized being received and said position 1 not being filled in, filling in said position 1 with a value of a pixel preceding said pixel X to be binarized in the same slice and acquiring a pixel to be binarized next; and
   (d) upon said position 1 being filled in, shifting the value of said position 4 to said position 3 and shifting the value of said position 3 to said position 2, and inputting an error value of a pixel having a horizontal coordinate value larger by one (1) than said pixel X to be binarized from among the pixels of the previous slice to said position 4.

6. The method of claim 4, said mask being formed by the steps of:
   (a) during binarizing the first pixel of said slice, shifting a value of said position 1 to said position 4, scanning an error value of a final pixel of a slice in the previous band corresponding to said pixel X to be binarized from said first memory and inputting the value to said position 1;
   (b) shifting a value of said position 4 to said position 3, scanning an error value of a pixel preceding said pixel X to be binarized from said second memory and inputting the error value to said position 4;
   (c) upon a signal for scanning the value of said pixel X to be binarized being received and said position 1 not being filled in, filling in said position 1 with a value of a pixel preceding said pixel X to be binarized in the same slice and acquiring a pixel to be binarized next; and
   (d) upon said position 1 being filled in, shifting the value of said position 4 to said position 3 and shifting the value of said position 3 to said position 2, and inputting an error value of a pixel having a horizontal coordinate value larger by one (1) than said pixel X to be binarized from among the pixels of the previous slice to said position 4.

7. A binarization method in an image scanner which scans an image of a document per unit of a predetermined scanning width by one band in which said document moves in a first direction with respect to said image scanner and said image scanner moves in a second direction perpendicular to said first direction, said method comprising the steps of:
   (1) setting a binarization mask including a target pixel and neighboring pixels around said target pixel in a first band, said first band having a band boundary, and performing a binarization by moving said target pixel within said first band;
   (2) storing values for binarizing a pixel adjacent to a neighboring second band adjacent to said first band in a memory;
   (3) determining whether some of said neighboring pixels included in said binarization mask belong to said first band, whereby some pixels of the second band are also pixels of the first band; and
   (4) whenever it is determined that some of said neighboring pixels included in said binarization mask belong to said first band, performing the binarization by substituting said stored values for binarization into said neighboring pixels of said binarization mask.

8. An image processing apparatus for binarizing an image scanned by a scanner which scans an image of a document per unit of a predetermined scanning width by one band in which said document moves in a first direction with respect to said scanner and said scanner moves in a second direction perpendicular to said first direction, said apparatus comprising:
   a means for setting a binarization mask including a target pixel and neighboring pixels around said target pixel in a first band and for performing a binarization by moving said target pixel within said certain band;
   a memory for storing values for binarizing a pixel adjacent to a neighboring second band adjacent to said first band;
   a means for determining whether any pixels of the second band are also pixels of the first band; and
   a means for performing the binarization by substituting said stored values for binarization into said neighboring pixels of said binarization mask, whenever it is determined that some pixels of the second band are also pixels of the first band.

9. An image process method for processing an image scanned by a shuttle type scanner, said scanner scanning a document by moving laterally across a band of the document to successively scan each unit-pixel wide slice of said band, then moving longitudinally along the document to the next adjacent band, and repeating the foregoing steps until each slice of each band of the document has been scanned, said method, said method comprising the steps of:
   (1) when a data slice has been scanned, determining whether a first memory scanning signal L-Mem-rd signal was received;
   (2) if not, jumping back to and repeating step (1); and if so, shifting a value of a position 1 of a mask to a position 4, scanning an error value of a previous band corresponding to a pixel to be binarized from a first memory, and sending a signal representative of the scanned value to the position 1 of the mask;
   (3) determining whether a second memory scanning signal S-Mem-rd signal was received;
   (4) if not, jumping back to and repeating step (3); and, if so, shifting a value of the position 4 to a position 3 and sending a signal representative of an error value of a pixel preceding the pixel to be binarized to the position 4;
   (5) determining whether a signal Center-Value-rd for scanning a value of the pixel to be binarized has been received;
   (6) if not, jumping back to and repeating step (5); and, if so, determining whether the position 1 is filled in;

(7) if so, jumping forward to step (8); and, if not, filling in the position 1 of the mask with a value of the pixel preceding the pixel to be presently binarized;

(8) shifting a value of the position 4 to the position 3, shifting a value of the position 3 to a position 2, and sending a signal representative of a pixel having a horizontal coordinate value larger by 1 than the pixel to be binarized among the pixels of the previous slice to the position 4 of the mask;

(9) binarizing the present pixel value using the format mask and processing the error value;

(10) storing the processing result of the error value in a second memory;

(11) determining whether the pixel presently binarized is a final pixel of the slice;

(12) if not, jumping back to and repeating step (5); and, if so, storing the error value in a position corresponding to the present slice of the first memory;

(13) determining whether the present band processing is finished; and

(14) if not, jumping back to and repeating step (5); and, if so, terminating the scanning operation.

* * * * *